United States Patent [19]

Clift et al.

[11] Patent Number: 4,475,931
[45] Date of Patent: Oct. 9, 1984

[54] GAS CLEANING

[75] Inventors: Roland Clift; Mojtaba Ghadiri, both of Cambridge; Michael J. Cooke, Cheltenham, all of England

[73] Assignee: Coal Industry (Patents) Limited, London, England

[21] Appl. No.: 196,339

[22] Filed: Oct. 14, 1980

Related U.S. Application Data

[63] Continuation of Ser. No. 010,403, Feb. 8, 1979, abandoned.

[30] Foreign Application Priority Data

Feb. 17, 1978 [GB] United Kingdom ............... 06385/78

[51] Int. Cl.$^3$ ............................................. B01D 53/12
[52] U.S. Cl. ........................................... 55/77; 55/96; 55/99
[58] Field of Search ................ 55/68, 77, 84, 94, 390, 55/96, 97, 261, 262; 208/52 R, 58, 61, 106; 423/215.5, 223

[56] References Cited

U.S. PATENT DOCUMENTS

| | | | |
|---|---|---|---|
| 1,825,707 | 10/1931 | Wagner, Jr. | 55/99 X |
| 2,875,844 | 3/1959 | Pring | 55/97 X |
| 3,912,464 | 10/1975 | Schulz | 55/97 X |
| 3,953,180 | 4/1976 | Hoffert et al. | 55/390 X |
| 4,010,013 | 3/1977 | Murayama | 55/262 X |
| 4,033,117 | 7/1977 | Smith | 55/99 X |

FOREIGN PATENT DOCUMENTS

| | | |
|---|---|---|
| 7103975 | 9/1971 | Netherlands. |
| 842527 | 7/1960 | United Kingdom. |
| 957982 | 5/1964 | United Kingdom. |
| 972980 | 10/1964 | United Kingdom. |
| 1178502 | 1/1970 | United Kingdom. |
| 1272014 | 4/1972 | United Kingdom. |
| 1292789 | 10/1972 | United Kingdom. |
| 1421421 | 1/1976 | United Kingdom. |

*Primary Examiner*—Robert Spitzer
*Attorney, Agent, or Firm*—Stevens, Davis, Miller & Mosher

[57] ABSTRACT

This invention relates to a method for the production of gases free from particulate contaminants, for use in driving gas turbines without causing fouling or corrosion of the blading.

The method comprises feeding a gas contaminated with particulate material, for instance produced by the combustion or gasification of coal, and a tackifying material, such as a crackable hydrocarbon or an inorganic compound, to a collection medium, preferably a fluidized particle bed, maintained at a temperature whereat the tackifying material becomes sticky and is deposited on the collection medium. The contaminants are removed by becoming stuck thereon.

4 Claims, 1 Drawing Figure

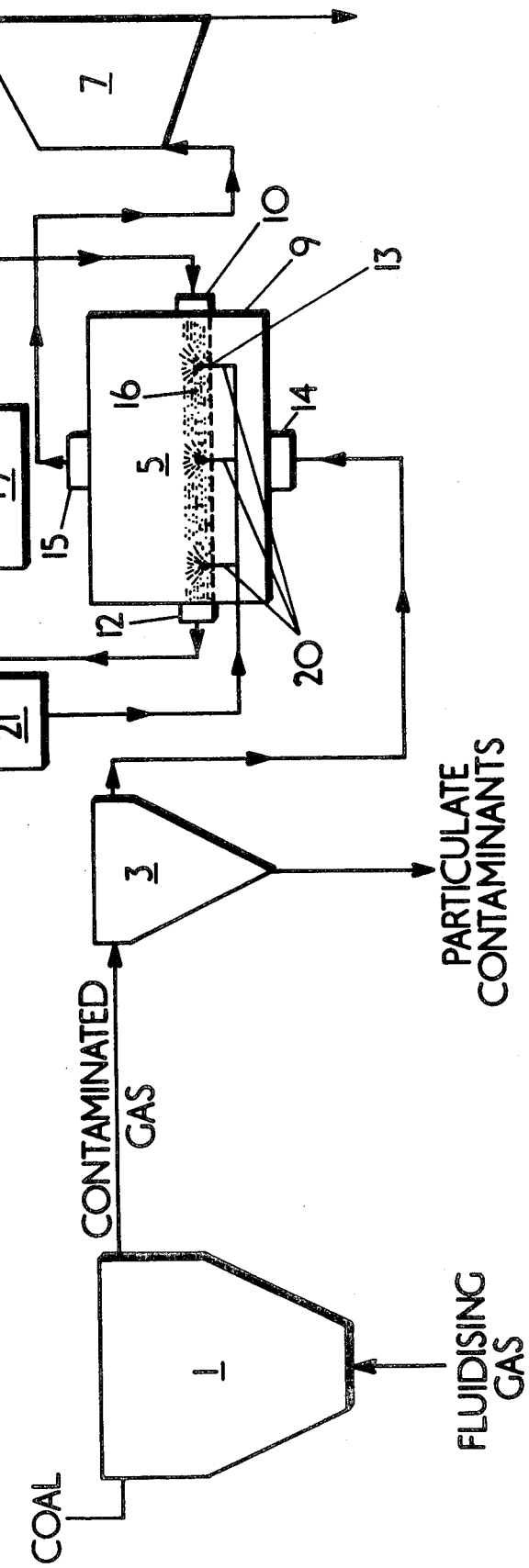

GAS CLEANING

This is a continuation of application Ser. No. 10,403 filed Feb. 8, 1979, now abandoned.

This invention relates to a system which is used to produce gases substantially free from contaminants.

It is envisaged that in a power plant solid fuel, e.g. coal, will be gasified to produce a combustible fuel gas, which will then be burned in a combustion stage, whence the gaseous products of combustion will be passed to a gas turbine for expansion.

It is further envisaged that in a power pland solid fuel, e.g. coal will be burnt to produce combustion gases which will be passed to a gas turbine for expansion.

The fuel gas or the combustion gases may be produced either in a fixed or fluidised bed or an entrained flow system. The fuel gas may be produced for instance using a water gas/producer gas-type treatment. The fuel gas normally contains proportions of carbon oxides, hydrogen, steam, methane and nitrogen and preferably contains substantial proportions of carbon monoxide and hydrogen. The combustion gas normally contains proportions of carbon oxides, oxygen and nitrogen.

However both gases also entrain during their production contaminants, which may be solids or liquids. The contaminants may be combustible, for instance solid fuel which has not been gasified or burned, coke particles, tar, and hydrocarbons, or may be incombustible, for instance fly ash or alkali-metal compounds. The liquid contaminants are usually present as aerosols. Most of the solid contaminants may be removed by a cyclone-type separator. A proportion of the contaminants of the fuel gas reach the combustion stage, wherein a further proportion is removed by being combusted. Nonetheless, a significant proportion of the contaminants remain in the gas stream and is introduced into the gas turbine along with the combustion product gases which are produced from the burning of the fuel gas.

Similarly a significant proportion of the contaminants remains in the combustion gas stream after passage through a cyclone and is introduced into the gas turbine along with the combustion gases. This significant proportion of contaminants, especially if it contains ash particles or alkali-metal compounds, can cause great damage to the gas turbine by fouling, corrosion and erosion, particularly of the blading.

It is therefore an object of the present invention to provide a method whereby combustion product gases from the burning of either a solid fuel or a fuel gas containing substantially no contaminants may be produced.

According to the present invention a method of producing a substantially contaminant-free product gas from a gas contaminated with particulate material comprises feeding the contaminated gas and a tackifying material to a collection medium maintained at a temperature whereat the tackifying medium forms a liquid of low vapour pressure which is deposited on the collection medium, thereby to render it sticky so that the contaminant particles adhere to the collection medium, and withdrawing a product gas from the collection medium.

Any of the gases referred to in this specification may be either a single component gas or a mixture of at least two components.

The collection medium may be a fixed bed of particles, but is preferably a fluidised or spouting bed of non-sticky, non-degradable particles. The bed of particles to be fluidised is preferably supported on a gas distributor plate of conventional type, and the contaminated gas is introduced through the plate to fluidise the particles, the pressure of the gas preferably being super-atmospheric. The fluidising or spouting system should be designed to prevent or minimise fouling which could thereby prevent satisfactory bed movement.

The tackifying material may be an organic material such as a crackable liquid hydrocarbon which forms the liquid of low vapour pressure by cracking to form a tarry liquid, which is deposited on the collection medium, and volatile components, which are entrained in the gas stream.

Alternatively, the tackifying material is an inorganic material, such as a non-corrosive compound which melts at a conveniently low temperature. The material is preferably fed to the collection medium in solution in a solvent, such as water, which is readily vaporised. The inorganic material may react with the particles of the collection medium to form a cement-like material, which will also be sticky and will therefore be able to collect the contaminants in the gas.

The solution of crackable liquid hydrocarbon may conveniently be introduced in the form of an atomised spray. In the case of a fixed bed the spray should be mixed with the contaminated gas before it is fed to the collection medium. This may also be the case with fluidised and spouting bed collection media. However in these cases it is also possible to spray the atomised liquid into the bed directly, while feeding the contaminated gas into the bed separately.

The collection medium may be maintained at a temperature up to 1200° C., and conveniently at a temperature of from 700° or 800° to 1000° C. At this temperature the solvent of an inorganic tackifying material will be quickly vaporised to leave the molten inorganic material which will be deposited on the collection medium and will remain there for a sufficient time to allow contaminants to adhere to the collection medium.

The collection medium may be maintained at the appropriate temperature by any conventional means. For example in the case of fluidised and spouting beds it is convenient but not necessary to maintain the bed at the appropriate temperature by the combustion of the fluidising gas. In one preferred embodiment, the fluidising gas and the contaminated gas are the same and are combusted in the bed.

In one instance, the contaminated gas may be a fuel gas obtained from a coal gasifier. The coal gasifier may comprise one or a series of fluidised beds in which the coal is heated and gasified in the presence of steam and/or an oxygen containing gas, whereby a fuel gas comprising as combustible components predominantly a mixture of hydrogen and carbon monoxide is produced. Methods by which this may be carried out are well known in the art. The fuel gas is then fed into a fluidised or spouting bed into which is also being fed an oxygen-containing gas and the tackifying material. The fuel gas is then combusted and low vapour pressure liquid deposited on the bed material.

Preferably the contaminated gas is first passed through one or a series of cyclone separators, wherein larger particulate contaminants are removed, the exhausting gas containing particulate contaminants at a level of about 1 g/m$_n^3$. The exhausting gas may in addition contain combustible particulate contaminants, aerosols of liquid contaminants and gaseous contaminants. The gas may then be fed into a fluidised or spouting bed into which is also being fed the tackifying material. Aerosols of liquid contaminants will also be removed in the present method by adherence to the collection medium, whether or not there is any low vapour pressure liquid thereon.

In a fluidised or spouting bed system the bed particles to which contaminants have adhered are increased in size and also are rendered sticky and so may agglomerate. To control the amount of agglomeration, and to remove the contaminants from the bed a proportion of the bed may be removed, either continuously or intermittently. The amount of the bed that is removed may be such that the size of the bed remains substantially constant, but preferably a weight of particles greater than the weight added to the bed by the contaminants and the low vapour pressure liquid is removed from the bed. The bed is then topped up with fresh uncontaminated particles. This may be done continuously. The fresh particles may be cleaned-up particles which have already been through the bed, or may be entirely fresh particles.

In the case of an organic tackifying material, the collection medium may be cleaned by burning off the tarry liquid adhered thereto. Preferably the collection medium is introduced into a fluidised bed, so that, when the tarry liquid is burned off, the contaminants are elutriated with the combustion products gases.

In the case of an inorganic tackifying material the collection medium may be cleaned by washing the inorganic material adhered thereto. The wash solvent may conveniently be the same as that in the atomised solution, for example water.

In a fluidised or spouting bed system the non-sticky, nondegradable particles must all be of such a size that, under the fluidising conditions used, substantially none of them may leave the bed by entrainment in the product gas. They should therefore have a minimum particle size of about 100 $\mu$m, but preferably about 500 $\mu$m although this size will vary with the fluidising conditions used. The particles must have substantially no tendency to agglomerate. In addition the particles should not be of an easily abradable character. Preferred materials from which the particles may be made are various washed sands and crushed refractory.

The contaminated gas may also contain gaseous contaminants, such as in the case of combustion gases sulphur dioxide, or, in the case of a fuel gas, hydrogen sulphide. These gaseous contaminants may be removed by providing a gas-absorbent collection medium. For a sulphur dioxide or hydrogen sulphide containing gas the collection medium may comprise iron oxides, limestone or dolomite.

Using the method of the present invention it is possible to remove from a contaminated gas at least 90% of the contaminants, and in many cases up to 99% of the contaminants may be removed, to give a product gas containing substantially only gaseous components.

Although it is envisaged that the present invention will be particularly applicable to the decontamination of coal-derived fuel-or combustion-gases in order to feed them to a gas turbine, it is not limited to such applications, and may be used to decontaminate the gases either from burning for instance natural gas, or from the gasification or burning of crude oil or peat, in which there are undesirable contaminants.

The invention will now be described, by way of example only, with reference to the accompanying drawing, in which there is shown schematically part of a coal processing plant, including an apparatus in which gases are decontaminated using a method according to the present invention.

Referring now to the drawing, a part of a coal processing plant comprises a fluidised bed reactor 1, cyclone separator 3, a particle collection bed 5 and a gas expansion turbine 7. The collection bed 5 comprises a housing 9 having a particle inlet 10 and outlet 12, a perforated plate 13, a gas inlet 14, a gas outlet 15 and sprays 20 by which tackifying material in an atomised form may be sprayed into the bed from store 21. Located on the perforated plate 13 is a bed 16 of sand particles having a minimum size of 500 $\mu$m. The particle outlet 12 leads to a particle treatment stage 19.

In a first example the plant is used as follows. Coal is fed to the reactor 1 operating as a combustor at a pressure of 15 bar and fluidised by passing air into the reactor 1. The reactor 1 produces a combustion gas which comprises mainly carbon dioxide, oxygen and nitrogen, and the manner of its production is well known in the art and needs no further explanation. The combustion gas has entrained in it ash, carbon particles and alkali-metal compounds as an aerosol. The combustion gas is then passed through the cyclone separators 3 wherein the larger of the entrained particulate contaminants are removed. The combustion gas that exits from the cyclone separator 3 still contains some particulate matter, but no more than about 1 $g/m_n^3$ in total.

The combustion gas is then passed into the particle collection bed 5 via gas inlet 14. The combustion gas is introduced through the perforated plate 13 at a rate of 7.0 $m_n^3$/s per square meter of the perforated plate 13. In this case the area of the plate 13 is one square meter. This fluidises the bed 16 of particles, imparting a fluidising velocity of 2.0 m/s to the bed. The bed has a depth of 0.15 m and has a weight of 150 kg.

While the combustion gas is being fed into the bed, tackifying material, which is a solution of boric oxide in water (boric acid) is sprayed through the nozzles 20 into the base of the bed 16 typically at a rate of 3.5 gms of boric oxide per second, wherein the water is vaporised by the heat of the bed. The wate vapour is carried off in the cleaned combustion gas and molten boric oxide glass is deposited onto and may react with the bed particles.

While the combustion gas is being cleaned in the particle collection bed 5 the following events also occur. Combustible contaminants, such as coal and coke dust, tar and vaporised hydrocarbons are substantially completely consumed, either while flowing freely in the bed or while adhered to the bed particles by the agency of the molten boric oxide deposited thereon. The combustible contaminants adhere to the bed either due to their inherent stickiness, for instance, in the case of tars, or through the agency of the molten boric oxide already deposited on the bed particles or the reaction product of the boric oxide and the bed particles. The temperature of 900° C. at which the bed is maintained is substantially the temperature at which the combustion gas enters the bed. The coal or coke dust which is burned may also comprise a proportion of ash, and this will suffer the same fate as the free ash as soon as the carbonaceous material has been burned. Once the contaminants are adhered to the bed particles, the contaminants are substantially removed from the combustion gas, and are eventually removed from the bed as described hereinafter. The gas product from the particle collection bed 5 contains less than 0.4 g/$m_n^3$ of contaminants, and therefore 96% of the contaminants have been removed by this process, which is operated according to the present invention.

In a second example the plant is used as follows. Coal is fed to the reactor 1 operating as a gasifier at a pressure of 15 bar and fluidised by passing air and steam into the reactor 1, which may comprise two or more fluidised beds. The apparatus produces a fuel gas having a calorific value of about 4.0 MJ/$m_n^3$, the combustible constituents of which comprise mainly carbon monoxide and hydrogen, and the manner of its production is well known in the art and needs no further explanation. The fuel gas has entrained in it ash, carbon particles and tar, and hydrocarbons as an aerosol. The fuel gas is then passed through the cyclone separators 3 wherein the larger of the entrained particulate contaminants are removed. The fuel gas that exits from the cyclone separator 3 still contains some particulate matter, but no more than about 1 g/$m_n^3$ in total.

The fuel gas then is passed into the particle collection bed 5 via gas inlet 14. The fuel gas is introduced through the perforated plate 13 at a rate of 7.0 $m_n^3$/s per square meter of the perforated plate 13. In this case the area of the plate 13 is one square meter. This fluidises the bed 16 of particles, imparting a fluidising velocity of 2.0 m/s to the bed. The bed has a depth of 0.15 m and has a weight of 150 kg.

While the fuel gas is being fed into the bed, fuel oil at a rate of typically 15 g/s is sprayed through the nozzles 20 into the base of the bed 16, wherein it is cracked by the heat of the bed. The volatile products of the cracking are carried off in the cleaned fuel gas, and a tarry liquid is deposited onto the bed particles. Once the contaminants are adhered to the bed particles, the contaminants are substantially removed from the fuel gas, and are eventually removed from the bed as described hereinafter. The bed is maintained at a temperature of 900° C., which is substantially the temperature at which the fuel gas enters the bed. The gas product from the particle collection bed contains less than 0.04 s/$m_n^3$ of contaminants and therefore 96% of the contaminants have been removed by this process, which is operated according to the present invention.

In a third example, the plant is used as follows. Coal is fed to the reactor 1, operating as a gasifier to produce a fuel gas, as in the second example. The gas is treated as in the second example up until it is fed into the particle collection bed 5.

The fuel gas, as in the second example, is then passed into the particle collection bed 5 via gas inlet 14. The fuel gas is introduced through the perforated plate 13 at a rate of 7.0 $m_n^3$/s per square meter of the perforated plate 13. In this case the area of the plate 13 is one square meter. This fluidises the bed 16 of particles, imparting a fluidising velocity of 2.0 m/s to the bed. The bed has a depth of 0.15 m and has a weight of 150 kg.

However, in this example, while the fuel gas is being fed into the bed, boric oxide solition typically at a rate of 3.5 g of boric oxide per second is sprayed through the nozzles 20 into the base of the bed, wherein the water is vaporised by the heat of the bed. The water vapour is carried off in the cleaned fuel gas, and molten boric oxide is deposited onto the bed particles.

Once the contaminants are adhered to the bed particles, the contaminants are subsequently removed from the fuel gas, and are eventually removed from the bed as described hereinafter. The temperature of 900° C. at which the bed is maintained is substantially the temperature at which the fuel gas enters the bed. The gas product from the particle collection bed contains less than 0.04 g/$m_n^3$ of contaminants, and therefore 96% of the contaminants have been removed by this process, which is operated according to the present invention.

In a further example, the point is used as follows. Coal is fed to the reactor 1 operating as a gasifier to produce a fuel gas as in the second example. The fuel gas is then passed through the cyclone 3, as in the second example, and fed to the particle collection bed 5, which is operating as a fluidised bed burner. At this stage, oxygen or air may be mixed with the fuel gas and passed into the burner 5. The fuel gas and air or oxygen are introduced through the perforated plate 13 at a rate of 1.4 and 4.6 $m_n^3$/s per square meter of the perforated plate 13 respectively. In this case the area of the plate 13 is one square meter. This fluidises the bed 16 of particles, imparting a fluidising velocity of 2.0 m/s to the bed. The bed has a depth of 0.15 m and has a weight of 150 kg. In a continuous process the fuel gas is ignited by the heat of the bed, which is maintained at a temperature of 1100° C. by the combustion of the fuel gas.

While the fuel gas is being fed into the bed boric oxide solution typically at a rate of 0.7 gms of boric oxide per second, is sprayed through the nozzles 20 into the top of the bed 16, wherein the water is vaporised by the heat of the bed. The water vapour is carried off in the clean product gas and molten boric oxide is deposited onto or reacts with the bed particles.

While the fuel gas is being burned in burner 5 the following events also occur. Combustible contaminants, such as coal and coke dust, tar and vaporised hydrocarbons are substantially completely burned, either while flowing freely in the bed or while adhered to the bed particles by the agency of the molten boric oxide deposited thereon or the reaction products of the boric oxide and the bed particles. The combustible contaminants adhere to the bed either due to their inherent stickiness, for instance, in the case of tars, or through the agency of the molten boric oxide already deposited on the bed particles. The temperature at which the bed is maintained is a temperature at which the fuel gas burns to give the desired temperature of product gas to be expanded through the gas turbine 7. The coal or coke dust which is burned may also comprise a proportion of ash, and this will suffer the same fate as the free ash as soon as the carbonaceous material has been burned. Once the incombustible contaminants are adhered to the bed particles, the contaminants are substantially removed from the fuel gas and are eventually removed from the bed as described hereinafter.

Product gas, comprising mainly steam, carbon dioxide and nitrogen is removed from above the bed 16 at a rate of 5.8 $m_n^3$/s and is used to drive the gas turbine 7. The product contains less than 0.01 g/$m_n^3$ of contaminants, and therefore 96% of the contaminants have been removed by this process, which is operated according to the present invention.

The contaminants are removed from the collection bed 5 in the following way, whichever example is followed.

Since approximately 1 g of contaminants is removed, mainly by adherence to the particles of the bed 16, from every cubic meter (normal) of combustion or fuel gas passed into the bed, the weight of the bed will be increasing due to particulates and the boric oxide or tarry liquid by approximately 38 kg in every hour (i.e. 25% of the bed per hour). Therefore a proportion of the particles is removed from the bed through particle outlet 12. The contaminants are removed from the bed with these particles. Usually about 50% of the bed is removed per hour and this portion is passed through the particle treatment stage 19, wherein the particles are washed in the case of inorganic tackifying material or combusted in the case of an organic tackifying material to make them suitable to be recycled to the bed through particle inlet 10. By controlling the amount of particles that are removed and replaced it is possible to maintain the bed at a constant size and having constant properties with regard to both the fluidisation and contaminant removal.

Thus by use of the present invention it is possible to decontaminate a gas to give a substantially uncontaminated product gas which may be used to drive a gas turbine.

We claim:

1. A method of producing a substantially contaminant-free product gas from a gas contaminated with particulate material comprising
   (a) passing the contaminated gas through a cyclone separator,
   (b) feeding the exhaust gas from the cyclone separator to a collection medium comprising a fluidised particle bed,
   (c) feeding a fuel oil into the collection medium,
   (d) maintaining the collection medium at a temperature from 700° to 1200° C. so that the fuel oil is cracked and deposits a tarry liquid on the bed particles, thereby rendering them sticky so that the contaminant particles adhere to the bed particles, and
   (e) withdrawing a product gas from the collection medium.

2. A method of producing a substantially contaminant-free product gas from a gas contaminated with particulate material, comprising
   (a) feeding the contaminated gas to a collection medium,
   (b) feeding a tackifying material to the collection medium, the tackifying material being a solution in water of a non-corrosive inorganic compound,
   (c) maintaining the collection medium at a temperature whereat the tackifying material forms a liquid of low vapour pressure which is deposited on the collection medium, thereby rendering it sticky so that the contaminant particles adhere to the collection medium, and
   (d) withdrawing a product gas from the collection medium.

3. A method of producing a substantially contaminant-free product gas from a gas contaminated with particulate material comprising
   (a) feeding the contaminated gas to a collection medium,
   (b) feeding a crackable liquid hydrocarbon into the collection medium,
   (c) maintaining the collection medium at a temperature at which the liquid hydrocarbon is cracked and deposits a tarry liquid on the collection medium, thereby rendering them sticky so that the contaminant particles adhere to the collection medium, and
   (d) withdrawing a substantially contaminant-free gas from the collection medium.

4. A method of producing a substantially contaminant-free product gas from a gas contaminated with particulate material, comprising
   (a) feeding the contaminated gas to a collection medium,
   (b) feeding a separate liquid tackifying material to the collection medium,
   (c) maintaining the collection medium at a temperature whereat the tackifying material forms a liquid of low vapour pressure which is deposited on the collection medium, thereby rendering it sticky so that the contaminant particles adhere to the collection medium,
   (d) withdrawing the gas from which contaminant particles have been removed from the collection medium, said tackifying material being a crackable liquid hydrocarbon.

* * * * *